(12) United States Patent
Ramesh et al.

(10) Patent No.: US 11,145,012 B2
(45) Date of Patent: Oct. 12, 2021

(54) USING CYBER-PHYSICAL SYSTEM-ENABLED MICROGRID SYSTEM FOR OPTIMAL POWER UTILIZATION AND SUPPLY STRATEGY

(71) Applicant: Amrita Vishwa Vidyapeetham, Tamil Nadu (IN)

(72) Inventors: Maneesha Vinodini Ramesh, Kerala (IN); Aryadevi Remanidevi Devidas, Kerala (IN); P. Venkat Rangan, Tamil Nadu (IN)

(73) Assignee: Amrita Vishwa Vidyapeetham

( * ) Notice: Subject to any disclaimer, the term of this patent is extended or adjusted under 35 U.S.C. 154(b) by 140 days.

(21) Appl. No.: 16/435,985

(22) Filed: Jun. 10, 2019

(65) Prior Publication Data

US 2019/0295192 A1    Sep. 26, 2019

Related U.S. Application Data

(63) Continuation of application No. 14/719,786, filed on May 22, 2015, now Pat. No. 10,346,934.

(Continued)

(51) Int. Cl.
*G06Q 50/06* (2012.01)
*H04W 12/12* (2021.01)

(Continued)

(52) U.S. Cl.
CPC .............. *G06Q 50/06* (2013.01); *H04W 4/38* (2018.02); *H04W 12/12* (2013.01); *H04W 12/125* (2021.01); *G01R 19/2513* (2013.01); *G01R 22/066* (2013.01); *H04L 67/12* (2013.01); *H04Q 2209/60* (2013.01); *Y02D 30/70* (2020.08); *Y02E 40/70* (2013.01); *Y04S 10/50* (2013.01); *Y04S 20/00* (2013.01); *Y04S 20/221* (2013.01);

(Continued)

(58) Field of Classification Search
None
See application file for complete search history.

(56) References Cited

U.S. PATENT DOCUMENTS 8,447,541 B2 * 5/2013 Rada ..................... G05F 1/70
                                               702/60
2009/0187499 A1 * 7/2009 Mulder ............... G06Q 10/00
                                               705/30

(Continued)

FOREIGN PATENT DOCUMENTS

JP         2013172570 A  *  9/2013

OTHER PUBLICATIONS

Lam et al., "A Novel Method to Construct Taxonomy of Electrical Appliances Based on Load Signatures" 2007 IEEE (Year: 2007).*

*Primary Examiner* — John C Kuan
(74) *Attorney, Agent, or Firm* — Donald R. Boys; Central Coast Patent Agency LLC

(57) ABSTRACT

A system for optimal power utilization and supply strategy in a microgrid has a smart meter connected to a micro grid, at least one micro electricity manager connected to the smart meter, at least one wireless switch board connected to the micro electricity manager, and at least one intelligent device connected to said micro electricity manager. The system for optimal power utilization and supply strategy is configured as a cyber-physical system capable of dynamic energy management to minimize mismatch between electricity demand and generation.

4 Claims, 10 Drawing Sheets

Related U.S. Application Data

(60) Provisional application No. 62/032,207, filed on Aug. 1, 2014.

(51) Int. Cl.
*H04W 4/38* (2018.01)
*H04W 12/125* (2021.01)
H04L 29/08 (2006.01)
G01R 19/25 (2006.01)
G01R 22/06 (2006.01)

(52) U.S. Cl.
CPC ............... *Y04S 40/00* (2013.01); *Y04S 40/18* (2018.05); *Y04S 40/20* (2013.01)

(56) References Cited

U.S. PATENT DOCUMENTS

| | | | |
|---|---|---|---|
| 2012/0098340 A1* | 4/2012 | Yokoyama | H02J 3/14 307/31 |
| 2013/0138669 A1* | 5/2013 | Lu | G06N 3/088 707/758 |
| 2013/0162037 A1* | 6/2013 | Kim | H02J 3/32 307/24 |
| 2014/0018969 A1* | 1/2014 | Forbes, Jr. | H02J 13/00034 700/295 |
| 2015/0301543 A1* | 10/2015 | Oso | G05B 15/02 700/291 |
| 2016/0189298 A1* | 6/2016 | Tokunaga | H02J 3/383 705/37 |

* cited by examiner

| MGA | f (PT) | Avg (iPT) |
|---|---|---|
| 1 | 15 | 19 |
| 2 | 20 | 18 |
| 3 | 17 | 16 |
| 4 | 18 | 17 |
| 5 | 2 | 8 |
| 6 | 1 | 6 |
| 7 | 4 | 10 |
| 8 | 3 | 7 |
| 9 | 13 | 5 |
| 10 | 16 | 10 |
| 11 | 12 | 8 |
| 12 | 5 | 15 |
| 13 | 8 | 17 |
| 14 | 6 | 14 |

USING CYBER-PHYSICAL SYSTEM-ENABLED MICROGRID SYSTEM FOR OPTIMAL POWER UTILIZATION AND SUPPLY STRATEGY

CROSS-REFERENCE TO RELATED DOCUMENTS

The present application is a continuation of co-pending U.S. application Ser. No. 14/719,786, filed May 22, 2015, which was filed claiming priority to U.S. provisional application 62/032,207, filed Aug. 1, 2014, disclosure of which was incorporated in entirety by reference in Ser. No. 14/719,786. Disclosure of the parent applications are incorporated in entirety at least by reference.

BACKGROUND OF THE INVENTION

1. Field of the Invention

The present invention is in the field of electric grid management and pertains particularly to methods and apparatus for reducing power requirements and network costs associated with detecting and reporting power theft on a micro power grid.

2. Discussion of the State of the Art

In the field of electric grid management, it is desired to reduce or eliminate the theft of power from a power grid. Theft of electricity from the power grid is more prevalent in developing countries like India for example where power theft losses amount to roughly one and one-half percent of gross domestic product (GDP). A micro power grid is a networked topology of intelligent processing nodes capable of collecting and processing information and of reporting collected information from node to node and eventually to a control facility via wireless communications.

The process of detecting power theft events that are not transmission losses due to natural events or other unexplained losses in power involves the collection and processing of power usage data on the grid and at least one algorithm for isolating the power theft current data from other available data relative to power usage.

A power theft detection algorithm known to the inventor is used to determine and isolate power theft data from other data on a micro grid. One challenge in power theft detection on a micro grid is that monitoring grid state and reporting power thefts via a plurality of intelligent processing nodes raises cost of communications for the particular network or topology of those distributed nodes on the grid.

Another challenge with sustaining power theft detection and reporting on the grid is that the components of the wireless communications network are typically distributed in overlay fashion over the power grid topology and also draw their power from the grid. Therefore, having these components always in an on state or requiring those components to stay on for longer "wake" periods to handle communications load can lead to sustainability issues regarding available energy on the grid. Furthermore, handling often piggybacked multi-hop data messages creates more network latency on the administrative portion of the grid and can result in bill processing delays.

Therefore, what is clearly needed is an apparatus that reduces power requirements and network costs associated with detecting and reporting power theft on a micro power grid.

BRIEF SUMMARY OF THE INVENTION

In an embodiment of the invention a system for optimal power utilization and supply strategy in a microgrid is provided, comprising a smart meter connected to a micro grid, at least one micro electricity manager connected to the smart meter, at least one wireless switch board connected to the micro electricity manager, and at least one intelligent device connected to said micro electricity manager. The system for optimal power utilization and supply strategy is configured as a cyber-physical system (CPS) capable of dynamic energy management to minimize mismatch between electricity demand and generation.

In one embodiment the smart meter is connected to the micro grid through a switching circuit. Also, in one embodiment the switching circuit comprises a first relay switch connecting to the microgrid, and a second relay switch connecting to a distributed energy generator. In one embodiment the distributed energy generator is connected to at least one renewable energy source. And in one embodiment the micro electricity manager is connected through direct wiring connections, wireless communication, or any other communications methodology to receive and send communication.

In one embodiment of the system the micro electricity manager is configured to communicate with more than one smart meter in a given location. Also, in one embodiment the distributed energy generator is connected to a Control unit configured for energy sustenance. In one embodiment the wireless switchboard is equipped with sensors measuring electricity consumptions of electrical equipment with low to medium electric load and transfers data to the smart meter. And in one embodiment the intelligent device is equipped with sensors measuring electricity consumption of electrical equipment with heavy electric load and transfers data to the smart meter.

In another aspect of the invention a method for optimal power utilization and supply strategy in a microgrid system, comprising classifying electrical equipment based on power utilization, real-time energy monitoring of the electrical equipment based on context awareness, and intelligently managing the electrical equipment based on the availability of power supply.

In one embodiment the method further comprises classifying electrical equipment based on power utilization, comprising steps of receiving information in respect of equipment name, power rating, usage area and location, initializing each electrical equipment at every first use of the electrical equipment to perform a first classification based on its electric load, heuristically determining patterns of electric load and usage during subsequent use of the electrical equipment, and dynamically classifying electric equipment based on electric load and usage of the electrical equipment.

In another embodiment the method further comprises real-time energy monitoring of the electrical equipment comprising steps of identifying contextual information of the electrical equipment based on electric load and usage and collecting real-time contextual information to be transmitted to the smart meter. In another embodiment the method further comprises receiving information in respect of monthly electricity budget, real time power cost from the utility company and real-time contextual information of the electrical equipment and analyzing the information by comparing power consumption and real-time data to output a decision list. IN another embodiment identification of contextual information of the electrical equipment is achieved by means of sensors.

DETAILED DESCRIPTION OF THE INVENTION

In various embodiments described in enabling detail below the inventor provides apparatus and methods for controlling how power theft information is collected and processed on a micro grid of a "smart" electricity distribution grid. The present invention is described using the following examples, which may describe more than one relevant embodiment falling within the scope of the invention.

Figure 1:
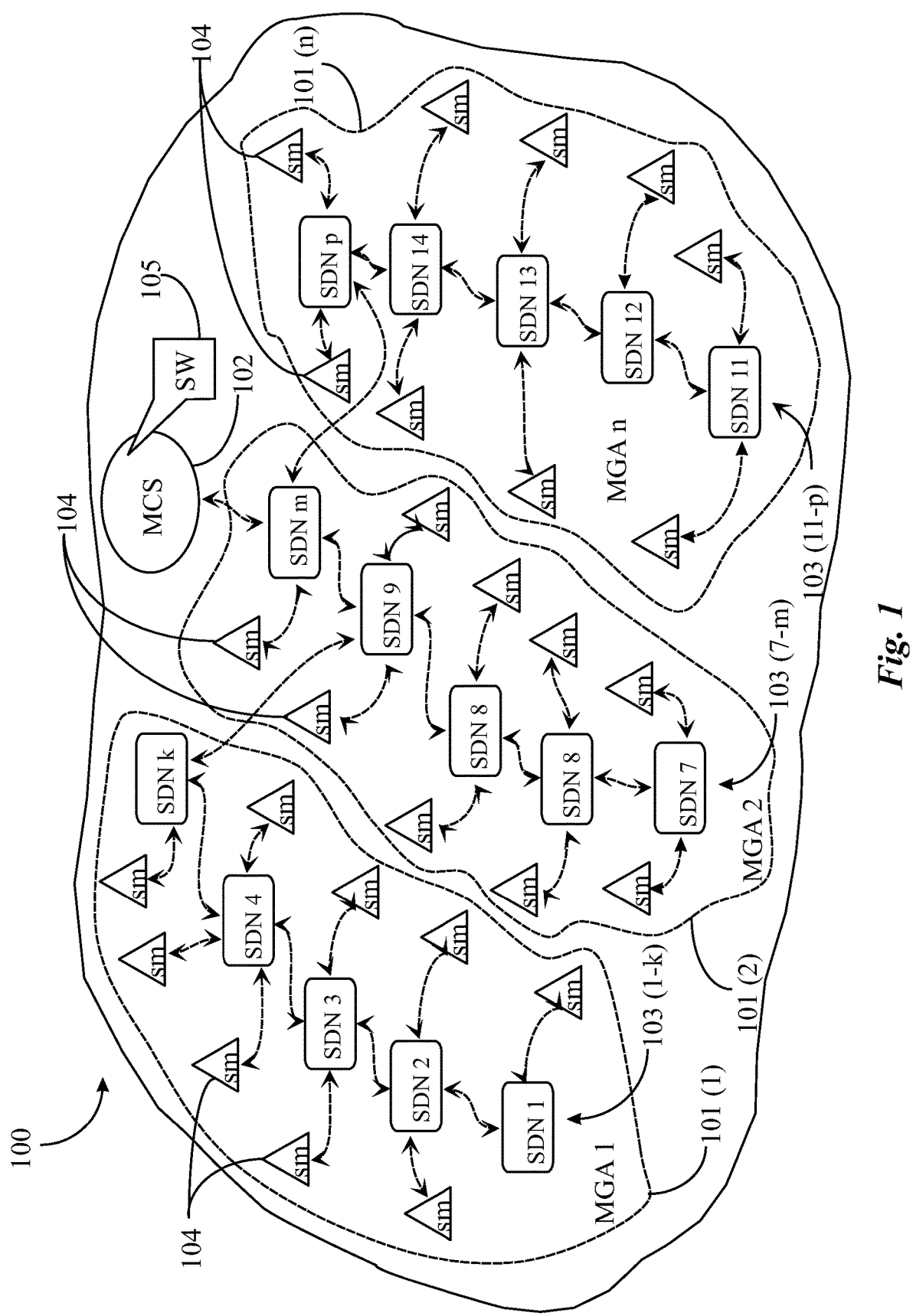
FIG. 1 is an architectural view of a micro power grid divided into individual grid segments in an embodiment of the present invention.

FIG. 1 is an architectural overview of a micro power grid 100 divided into individual grid segments in an embodiment of the present invention. Micro Power Grid 100 may be part of a larger smart electricity distribution grid. Micro grid 100 comprises a number of topologically isolated grid segments 101 (1-$n$), also referred to herein as micro grid areas (MGAs). An MGA may include connected power consumers located along an electricity distribution line or branch of the grid.

Each MGA 101 (1-$n$) includes a plurality of smart distribution nodes (SDNs) arranged in overlay fashion along an electricity distribution path through the topology of the MGA. MGA 101 (1) includes SDNs 103 (1-$k$) distributed along the path of electricity distribution such as one per pole for elevated power lines. Each SDN 103 (1-$k$) includes a processor or microcontroller, and at least one current sensor that measures current going through the line in both directions. MGA 101 (2) includes SDNs 103 (7-$m$) and MGA 101 ($n$) includes SDNs 103 (11-$p$).

It is important to note herein that a MGA may include more than a single electricity distribution main, cable, branch, or path without departing from the spirit and scope of the present invention. SDNs 103 (1-P) represent a total number of SDNs in visible micro grid 100. There may be more or fewer SDNs integrated to micro grid 100 without departing from the spirit and scope of the present invention. SDNs 103 (1-$k$) in MGA 101 (1) are enabled to communicate with one another by onboard wireless communications modules each having a range that at least reaches a next SDN in line. The communications may be hosted by a wireless fidelity (WiFi) network, a Zigbee wireless network, or other wireless services should they be available and more appropriate for the distribution architecture of the SDNs.

Each MGA 101 (1-$n$) includes a plurality of smart meters (SMs) 104. SMs 104 are designed for distribution to consumer sites within range of communication of one or more SDNs. SMs 104 include at least one current sensor that is capable of measuring the current through the meter bi-directionally. There may be one or more SMs distributed to a power consuming location such as a smart home network or commercial network. One SDN may regularly communicate with one or more than one SM 104 in real time.

A SM 104 includes one or more sensors to measure current bi-directionally as it flows through the meter. SMs 104 measure the current in both directions and communicate via wireless communications module with the closest SDN. In this way a tree-like topology for the micro power grid is provided in overlay fashion and the components are integrated (hard wired/plugged into) to the power grid. SMs 104 represent the bottom level in component hierarchy and report to the nearest SDNs within range. Each SDN 103 (1-$p$) measures the current flowing through it and forwards the data upstream to the next SDN in a current packet (CP). In this particular example, there is one top or parent SDN 103 ($m$) within MGA 101 (2). The process repeats at each SDN in the line within each MGA 101 (1-$n$).

SDNs may receive CPs from all of the descendant nodes and may extract and average the values, including the direction vectors indicating the direction of the current. Therefore, each SDN processes data received from all of the currently active descendant nodes and passes the information upstream to the next node before becoming inactive again during the routine.

Micro grid 100 includes a micro grid control (MCS) station 102 analogous to a master server that controls the micro grid segment-by-segment, introducing flexibility in control options for the entire micro grid. MCS 102 includes at least one processor and is coupled to at least one data repository. MCS 102 also hosts software (SW) 105 executing on the at least one processor from a non-transitory medium. MCS 102 communicates directly with the top or parent SDN 103 ($m$). SW 105 includes instructions for collecting and processing information from down-line components on the micro grid to obtain power theft information for each MGA comprising micro grid area 100 under control of MCS 102. SW 105 utilizes the resulting data calculated by algorithm for each MGA 101 (1-$n$) to classify each of the MGAs according to the data analyzed.

In classifying the MGAs, the system learns which of those MGAs are experiencing higher power theft issues and which of those MGAs are not. SW 105 includes instruction for resetting the time interval between a power theft check for an MGA and instruction for changing or adjusting the hop count (number of node hops upstream for data packets). This process may or may not be initiated for an MGA because initiation may depend upon the classification assigned to an MGA under control of the MCS. Moreover, the process is dynamic and may be set to occur upon MCS determination of a change in classification for an MGA under its domain. The hop count is equal to the number of times a packet must stop at an SDN for processing. In one embodiment, packets may pass through an SDN without interception for processing such as if the particular SDN was subtracted from the previous hop count. Packets may also completely bypass an SDN (SDN dropped) and sent to the next one further upstream provided the target SDN is within wireless communications range.

Generally speaking, a MGA that is classified as having higher power theft ratio may be monitored at more nodes (higher hop count) and therefore may experience a longer power theft check period duration. MGAs that experience a much lower power theft ratio may have hop counts reduced which may lead to shorter power theft check duration. In one embodiment where hop counts are reduced along an MGA line, the remaining hop counts may be kept stable while the hop addresses (SDNs) are rotated periodically adding and subtracting the same number of addresses at each rotation to maintain the same hop count.

Figure 2:
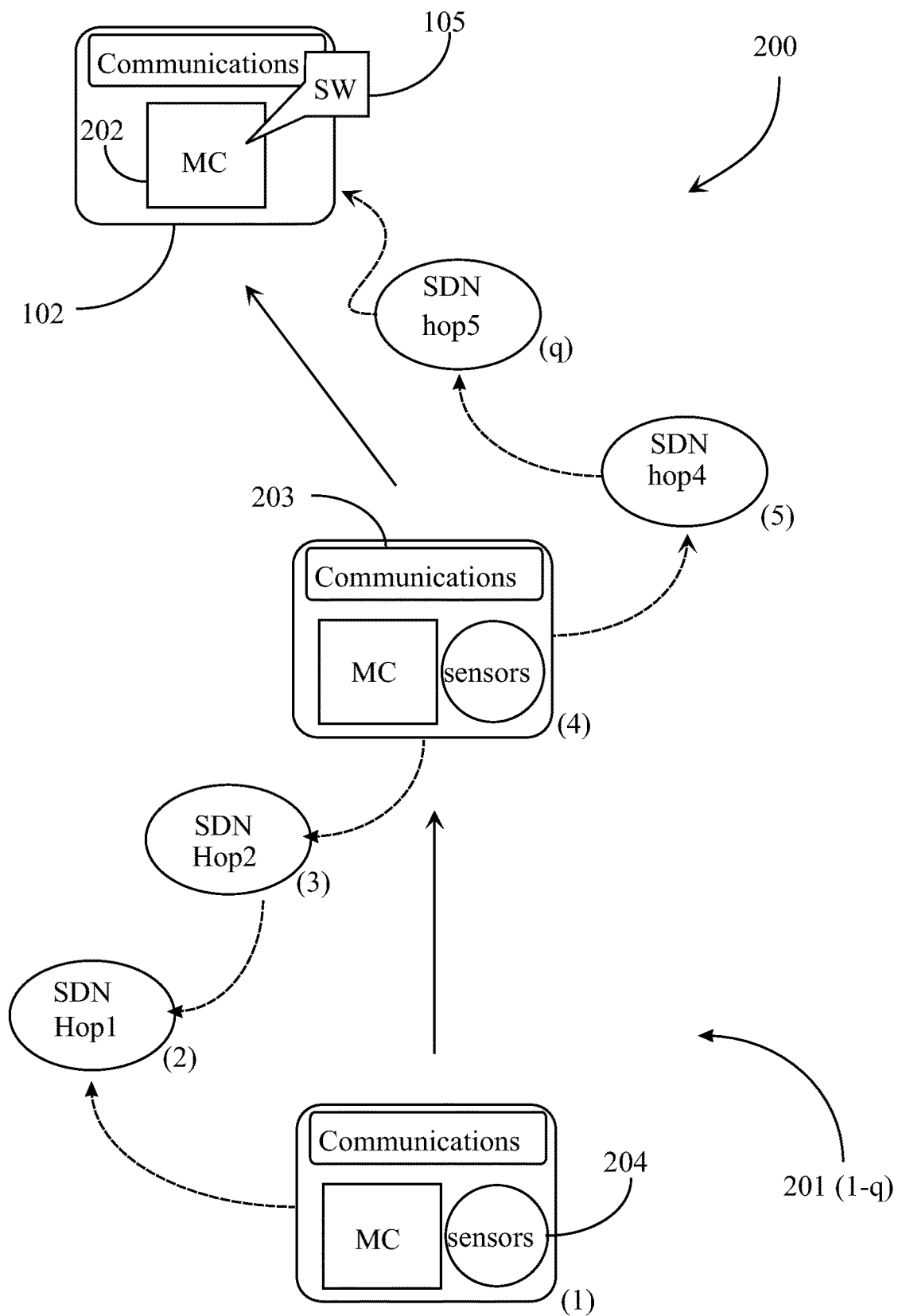
FIG. 2 is a block diagram depicting smart distribution nodes downstream from a micro grid control station.

FIG. 2 is a block diagram depicting micro grid area line 200 with smart distribution nodes downstream from a micro grid control station. Smart distribution nodes (SDNs) 201 (1-$q$) are analogous in description to any of SDNs 103 (1-$p$) of FIG. 1. In this example a single hierarchal line of SDNs represent an arm of the micro grid or a micro grid area (MGA). SMs are not depicted in this example but may be assumed present.

Each SDN 201 (1-$q$) has one or more sensors 204 to measure current going through the device in both directions in the line. For example, there may be one SDN at every power pole having branch off to consumers. During a power theft check routine, each SDN measures and records the total current going through it sending the recorded information upstream. Each SDN waits for packets from descendant SDNs downstream that include the current values recorded at those locations on the grid. At the top of the SDN hierarchy the reported current values of the descendant SDNs and connected SMs may be extracted and summed. All of the current information from bottom layer SMs to the parent SDN for the micro grid is aggregated at micro control station (MCS) 102 also depicted in FIG. 1. The information includes direction vectors indicating the direction of the current measured at each reading collected and for computed current averages. Each SDN 201 (1-$q$) includes a wireless communications module 203 for communications and a micro controller (MC) for processing data.

In this example data is depicted as being passed upstream to MCS 102 executing SW 105. In one embodiment a total hop count may be enforced that includes stops at each SDN on line 200 before MCS 102 receives all of the power theft data. The total hop count equals five hops from SDN 201 (1) representing the most remote SDN from the MCS. In one embodiment reducing the hop count simply means eliminating some SDN addresses from the destination list. In this example, SDNs 201 (2), (3), (5), and (q) may be eliminated from the hop count. In this case the hop count is reduced to one hop at SDN 201 (4) before MCS 102 receives the data as illustrated by solid arrows between the active or "awake" nodes.

In one embodiment reducing the hop count also deactivates the eliminated SDNs from reporting at all during a power check theft routine. In this embodiment the hop count may be maintained during a subsequent power theft check routine while the hop count addresses are rotated out eliminating nodes that reported in the last check and incorporating the nodes that were eliminated in the last check. Such leeway is allowable if classification of an MGA results in very low power theft ratio to total current.

In one embodiment hop counts can be reduced without eliminating participation of a node in the power theft check data collection. For example, different hop patterns such as stop at "every other node in the line of nodes". In one embodiment the wireless range of a communications module 203 may be a factor that influences the degree of hop count adjustment (to lower counts). An SDN may only communicate with other SDNs that are within wireless range. However, the wireless range may vary widely depending on infrastructure involved.

In one embodiment hop counts are reduced for an MGA line of components such as line 200 leading to a shorter period of runtime during a power theft check because each SDN waits for fewer messages arriving from downstream components. Also, the time period between power theft check routines for an MGA may be lengthened according to algorithmic processing of current data for the MGA and its resulting classification. This allows power conservation with respect to the power requirements of the nodes on the grid by enabling less processing time individually and more sleep time between power theft routines. Likewise, the reverse may also happen (rise in hop count and shortening of time interval between checks) according to the most recent data results and classification of an MGA. In this way MGAs on the micro grid that have higher power theft statistics receive more scrutiny while areas reporting lower power theft statistics receive less scrutiny.

Figure 3:
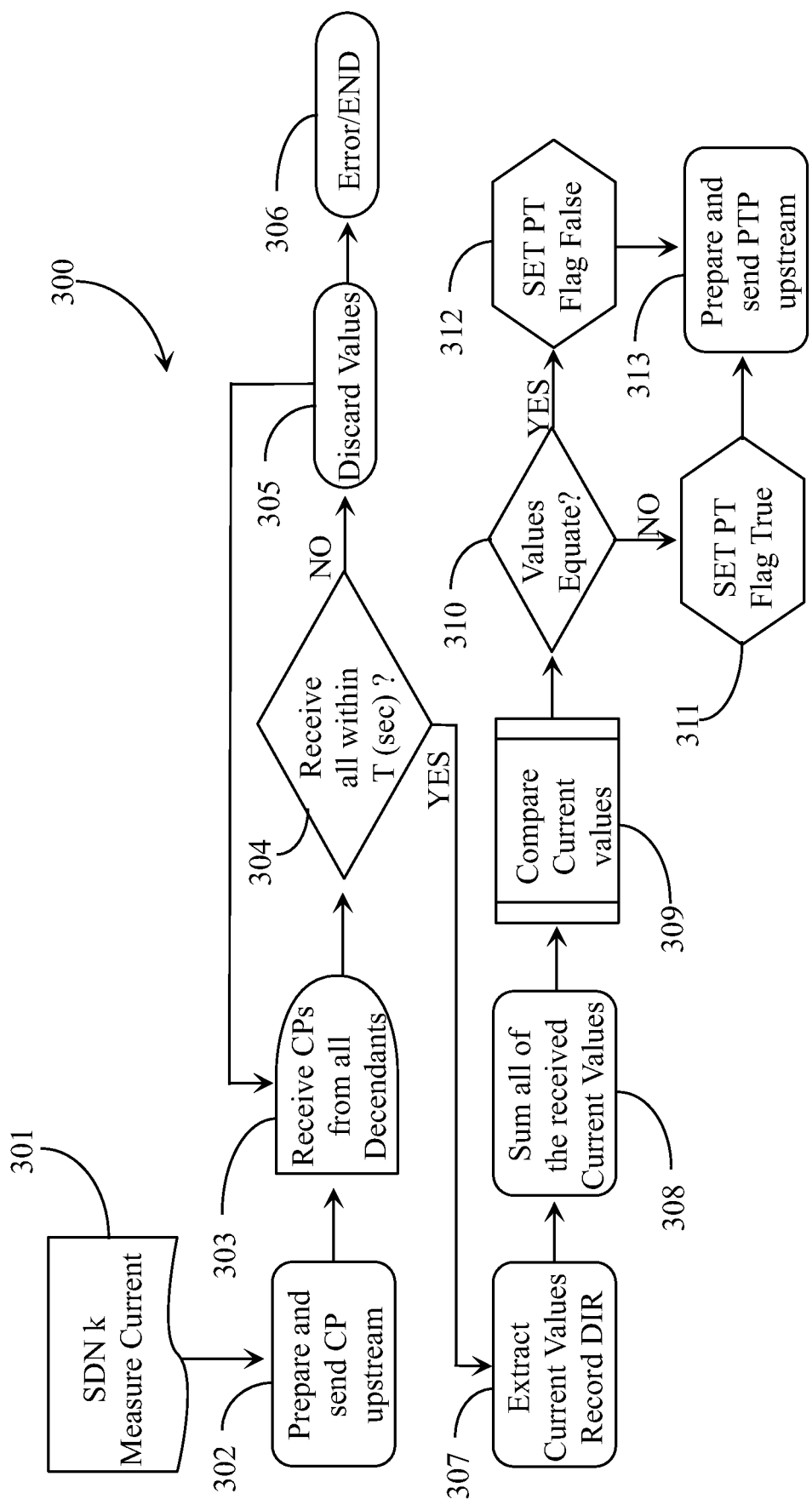
FIG. 3 is a process flow chart depicting steps in determining power theft on a micro grid segment.

FIG. 3 is a process flow chart 300 depicting steps in determining power theft on a micro grid segment. At step 301, a smart distribution node such as SDN 101 ($k$) of FIG. 1 measures and records the total amount of current (ik) going through it in both directions. In one embodiment the current through the SDN may be measured using Kirchhof's Current Law (KCL) know to the inventor. At step 302, the SDN generates and sends a current packet (CP) upstream to the next SDN on the current hop list. The current packet sent may minimally include the source identification (ID) of the sending node, the direction of the current measured, and the total amount of the current measured, the time stamp for the measurement, and the destination ID to the next node on the hop list. Current values for both directions may be included in the same current packet without departing from the spirit and scope of the present invention.

The SDN waits to receive all of the current packets (CPs) from all of its active descendant nodes at step 303. At step 304 the SDN may make a determination if it has received all of the expected current measurements from the descendant nodes in the MGA tree. In one embodiment a timeout period may be enforced wherein the SDN must receive all of the data or 100% reporting before the period is set to expire. At step 304, if the SDN has not been able to receive data from all of the expected descendant nodes within the time period, the SDN may abandon all of the values that were received in step 305 and perform an error/end operation at step 306. This may end the process for the particular SDN or the SDN may try again a number of times before ending. In the case of retry, the SDN may re-measure the current going through it and send another CP packet. In case of error, the error message sent from the SDN may be to notify administration entities to look at and fix any problems such as node failure, line failure, etc.

If at step 304 the SDN has accounted for all of the expected messages, it extracts at step 307 all of the current values reported including direction information (DIR) flag indicating the direction of the current readings. At step 308 the SDN may sum all of the current values for both directions. The summation might be expressed as $$I_{dk} = \sum_{j=1}^{n} i_{air}^{j} \times i_{j}.$$

At step 309 the SDN may compare the summed current values with the current values recorded for that SDN. At step 310 it is determined whether or not the values can be equated to one another within an acceptable level that might account for transmission (TX) loss (copper loss), and an acceptable error range expressed in the data [if ik==idk−TX Loss+/−Err val].

If at step 310 the values are equal within the pre-defined error range, the SDN may determine to set a power theft indication flag to false at step 312 indicating low or no power theft issues with that data. If the SDN determines that the values do not equate satisfactorily, the SDN may set the power theft flag to true at step 311, indicating power theft detection. The SDN may prepare a power theft packet (PTP) containing the results of the information processed at that node and send it upstream according to one embodiment to the controlling MCS. The power theft (PT) message may minimally contain the source identification (ID) of the sending node, the direction of the PT current detected, the total amount of the PT current, the time stamp for the calculated results, the PT flag setting, and the destination ID to the MCS that controls the MGA.

It is important to note that the process of summing and comparing current values may be allotted to each SDN on a distribution line or to just the SDN retaining the highest position in the SDN hierarchy for an MGA. In that case the last SDN may contain the logic or instruction to perform those routines described above. In another embodiment each MGA has a top SDN that reports directly to a single MCS that controls the micro grid. In this embodiment the MCS may process the raw data collected from the descendant nodes in each MGA of the micro grid without departing from the spirit and scope of the present invention. In another embodiment each SDN performs the same processing and messaging tasks with each SDN in the line re-calculating results after reporting its own current data. The algorithm that is used to calculate the power theft data is known to the inventor as a power theft detection algorithm (PTDA).

The algorithm in basic format may be expressed as follows:
Measure current (ik)
Send CP message
Wait(t<Tsec) until Receive[CP1, CP2, . . . , CPn]
if(!Receive[CP1, CP2, . . . , CPn]&&t>Tsec)
Discard CP1, CP2, . . . , CPn
After 'm' number of rejection of CPs, Send message to MCS
else if((Receive[CP1, CP2, . . . , CPn]&&t<T
Extract current values i1, i2 . . . in
Insert sign according to the direction $i_{jdir}$ 15. $i_{dk} = \sum_{j=1}^{n} i_{air}^{j} \times i_{j}$ 16. Compare($i_k$, $i_{dk}$)

17. if($i_k == i_{dk} - Tx_{loss} \pm Err_{val}$)

18. $PT_{flag}$=false 19. end if 20. elseif($i_k != i_{dx} - Tx_{loss} \pm Err_{val}$)

21. $PT_{flag}$=true

22. Send $PT_{msg}\{src_{ID}, i_{air}, i_{PT}, PT_{flag}$ = true, time_stamp, $mcs_{ID}\}$ to MCS 23. end if 24. end if In one embodiment of the invention, step 302 may be performed after step 304 if it is determined that the SDN has received all messages from descendants within the time T. If T expires before all messages are received, then step 302 may not be performed to reduce redundancy.

Figure 4:
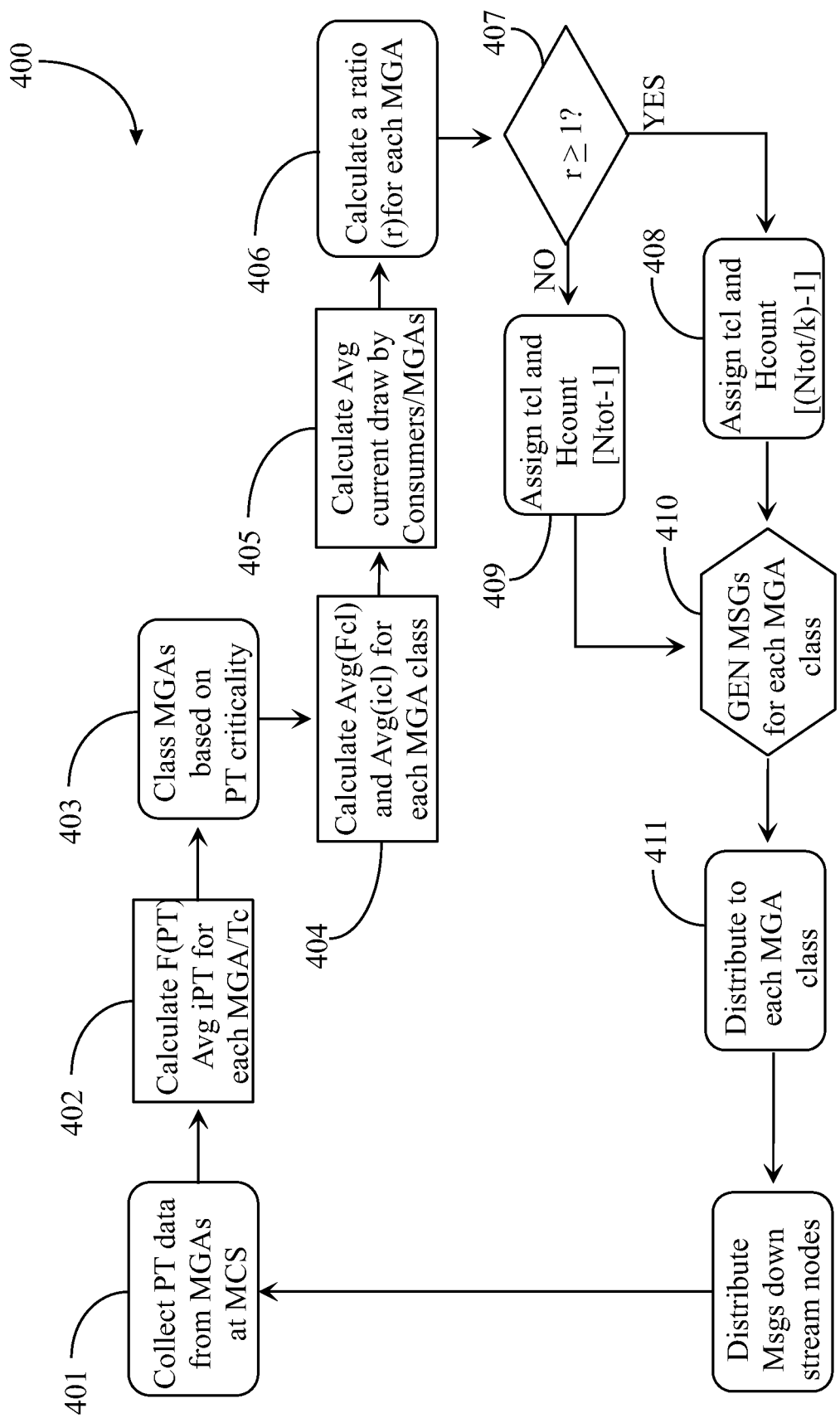
FIG. 4 is a process flow chart depicting steps in dynamic adjustment of power theft check periods and the number of current data transmission hops enforced for individual micro power grid segments in an embodiment of the present invention.

FIG. 4 is a process flow chart 400 depicting steps in dynamic adjustment of power theft check periods and the number of current data transmission hops enforced for individual micro power grid segments in an embodiment of the present invention. Process 400 may be added onto the end of process 300 described above. At step 401 all of the power theft (PT) data for each MGA on the micro grid under MCS control are collected at the controlling MCS. The power theft data is collected using the power theft detection algorithm (PTDA) described further above for Tc duration (time of data collection). An algorithm is provided and termed by the inventor Efficient Power Theft Data Networking Algorithm (EPTDNA). EPTDNA works with PTDA to more efficiently communicate and collect the power theft information. The power theft data is collected from all of the MGAs under the control of the MCS. Tc might be in the order of days or weeks.

At step 402 the MCS with the aid of SW analogous to SW 105 of FIG. 1, calculates the frequency (F) of detected power theft (PT) events and the average power theft current iPT for each MGA during the time Tc, which is the time allotted for collection of PT data for a MGA. Based on the power theft data calculations, the MGAs are each classified at step 403 according to the criticality of the data results using an available algorithm such as medoid or k-means. In one example, there may be three categories such as frequently identified MGA (FMGA), occasionally identified MGA (OMGA), and extremely unlikely identified MGA (EU-MGA). Power theft statistics are higher in FMGAs, lower in OMGAs and lower still in EUMGAs. There may be more or fewer categories of classifications of power theft criticality without departing from the spirit and scope of the present invention.

At step 404, the MCS with the aid of SW 105 of FIG. 1 calculates the average frequency of power theft data in each class (Fcl) of MGAs and the average power theft current (icl) for each class of MGAs. At step 405 the MCS calculates the average maximum current draw by consumers (icon) for all the MGAs under control of the MCS. At step 406 the MCS calculates a ratio (r) for each MGA under the control of the MCS where the ratio equals the average maximum consumer draw on the MGA divided by the average power theft current iPT for the MGA. At step 407 the MCS determines if r is greater than or equal to 1 for each MGA.

If r is equal to or greater than 1 in step 407 the process moves to step 408 where the MCS sets tcl (time duration before a periodic power theft check may occur on the MGA). The MCS also sets the transmission hop count (Hcount) for the MGA as the total number of nodes divided by the k factor −1. If else at step 407, then the process moves to step 409 where the MCS sets tcl and the Hcount for the MGA as the total number of nodes −1 [Ntot−1]. In the case of r being greater than or equal to 1, the tcl=the average Tc value or (Tcl) for the MGA class. Tc is the time duration for the EPTDNA phase-one data collection time duration for an MGA. In the case of r being less than one, then tcl is =to Tcl multiplied by r. Steps 409 and 408 are assigned for a class of MGAs. Therefore, every MGA in a particular class of MGAs will be assigned tcl and Hcount.

At step 410 the MCS generates messages to each of the MGAs in a class of MGAs under control of the MCS. A message assigning tcl and Hcount to a class of MGAs is distributed only to SDNs in those MGAs. The parent SDNs (closest to MCS) in each MGA may be responsible for distributing the information to descendant components (SDNs) within each MGA. SDNs may also update smart meters located in the same MGAs hosting those SDNs. The new tcl and Hcount for an MGA classification replaces the old setting and persists through the next Tc duration.

Figure 5:
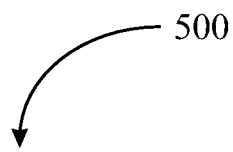
FIG. 5 is a table depicting power theft frequencies and average power theft currents recorded during a power check time period for a number of identified micro power grid segments.
Figure 6:
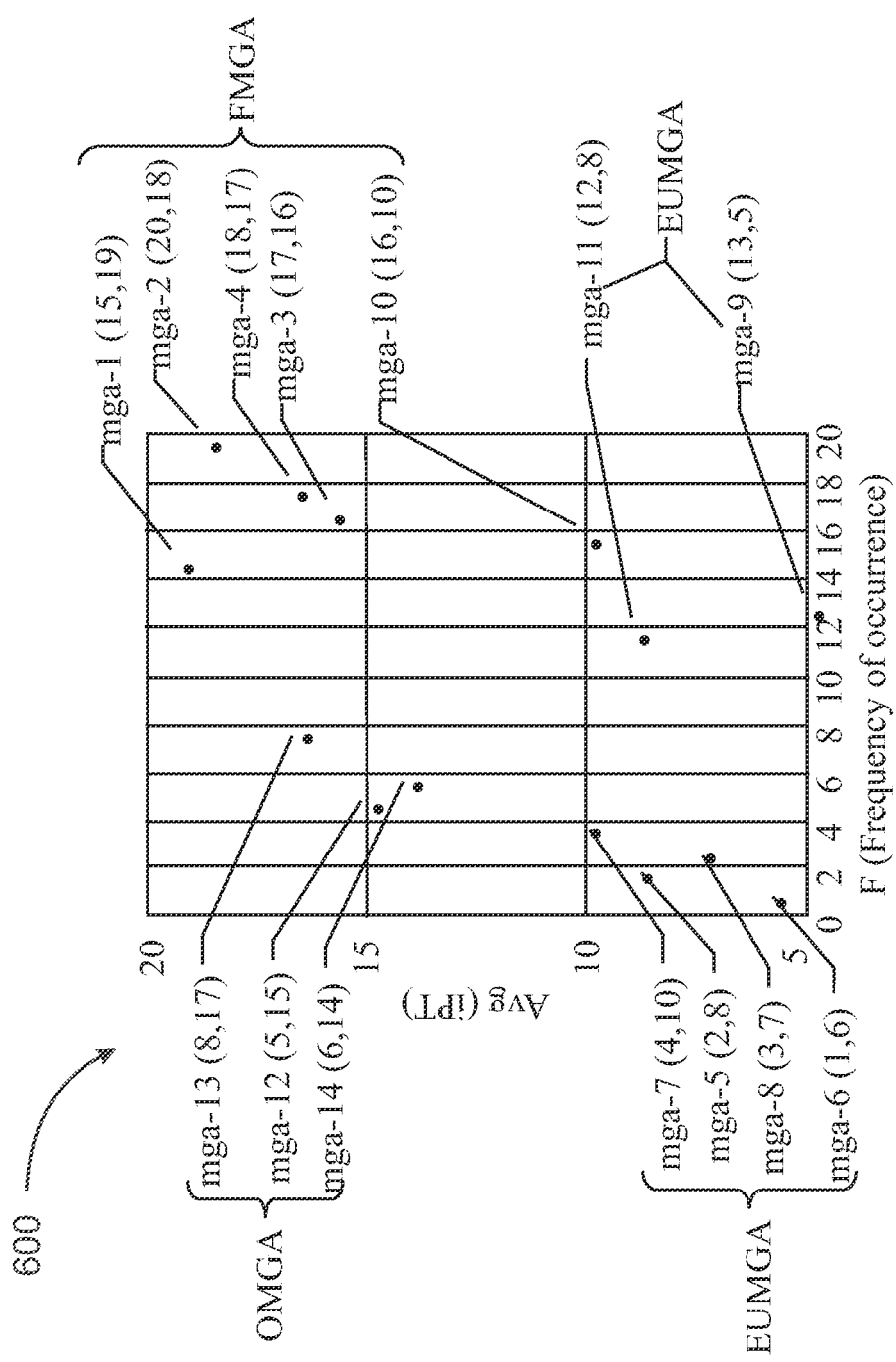
FIG. 6 is an x/y graph depicting the plotted locations of the micro power grid segments of FIG. 5.

FIG. 5 is a table depicting power theft frequencies and average power theft currents recorded during a power check time period (Tc) for a number of identified micro power grid segments. FIG. 6 is an x,y graph depicting the plotted locations of the micro power grid segments of FIG. 5.

Referring to FIG. 5, the identified micro grid segments listed in table 500 are referred to by the inventor as Micro Grid Arrays (MGAs). In table 500, the first column under MGA lists 14 MGAs making up a micro grid controlled by a micro grid control station (MCS).

Listed in the column adjacent to the MGA column, are the numbers of power theft events detected as a result of processing collected current data for the MGAs. The numbers represent frequency of detections over the duration Tc for each MGA. Table 500 includes a third column listing the average power theft current [Avg (iPT)] for each of the fourteen MGAs making up the micro grid. Current is measured in amperes.

The data provided in table 500 is utilized to classify each of the MGAs according to three classes of MGAs namely frequently identified MGA (FMGA), occasionally identified MGA (OMGA) and extremely unlikely MGA (EUMGA). There may be more or fewer that three categories without departing from the spirit and scope of the present invention. It is also important to note herein that both the frequency of power theft events and the average power theft current are used as input to calculate a class for an MGA using an algorithm adapted for the purpose like medoid or k-means described further above.

Other tables might be derived and made available such as a table depicting the average frequency of power theft (Fcl) for a class of MGAs and the average power theft current [Avg (icl)] for the class. Still another table may depict the average time (Tcl) in days allotted for power theft check data collection and processing for a class of MGAs, the power theft ratio (r) calculated and averaged for the class, and the average time expiring after Tcl ends and before periodic power checks begin for the class.

Referring now to FIG. 6, x,y graph 600 depicts the plotted positions of classified MGAs one through fourteen listed in FIG. 5 above according to the data. On this two-dimensional graph, x=the frequency (F) of power theft data events detected during period Tc and y=the average power theft current draw [Avg (iPT)].

MGAs classified as FMGAs include MGAs 1-4 and 10 clustered generally to the upper right portion of the graph. MGAs classified as OMGAs include MGAs 12-14 generally clustered to the left and upper portion of the graph. MGAs classified as EUMGAs 5-9 and 11 generally clustered in the left lower portion of the graph.

Classification of MGAs associated with a lower power theft frequency and average current draw may result in adjustment in the number of times or hops that messages on the classified MGAs must undergo before reaching the MCS controlling those MGAs. Thus, Tc (time for data collection and processing) may be shortened due to lower messages processing load and network latency. Moreover, power theft check intervals for those classified MGAs may be adjusted higher enabling the nodes drawing power from the micro grid to sleep longer in a low power mode like sleep mode or standby mode or powered off for longer periods.

EPTDNA enables network flexibility and frees up more bandwidth to enabling better focus on the more urgent power theft trends affecting the micro grid. It will be apparent to one with skill in the art of networking that a MCS in control of a micro grid may communicate with other MCSs controlling adjacent micro grids installed across a region. Therefore, reductions in network latency, and node processing times on a micro grid may be accumulative across the larger smart distribution power grid.

In another aspect the invention relates to a system and method for optimal power utilization and supply strategy in a microgrid system. In this aspect the invention provides a system for system and method for optimal power utilization and supply strategy in a Cyber Physical System (CPS) enabled microgrid.

The system in an embodiment of the invention seeks to achieve a smart microgrid system for optimal power utilization and optimal supply strategy. This is achieved by integration of smart devices, renewable energy harvesters, appropriate power electronics, storage and automation, all connected and controlled through a wireless network system. Newly designed wireless networks enable self-healing of the grid and make residences and buildings smart and enable dynamic energy management of the smart buildings by devising optimized algorithms, controlling and management of a microgrid and between the distributed microgrids using intelligent devices and distributed algorithms. CPS systems are a combination of physical and computational components. CPS-enabled systems are found extensively in domains as diverse as transportation, aerospace, automotive, civil infrastructure, healthcare and energy management. CPS enabled systems make use of sensors with intelligence mechanisms capable of communicating over a network.

The system in an embodiment of the invention provides for CPS-enabled architecture for conventional buildings which are connected to the powergrid and as well as such buildings which generate their own power through renewable energy sources. Buildings integrated with Distributed Energy Generators (DEG) are capable of small-scale power generation or storage. A typical DER system comprises of a variety of power sources such as a photovoltaic source, micro-wind turbine or a fuel cell that produce direct current (DC Current) that is subsequently converted to alternating current (AC Current) through conductors such as an electric cable. DEG units are installed in the building to generate renewable energy. For optimal use of renewable resources, a control device is implemented at the distribution board. An objective of the system is to increase usage of renewable energy sources that will lead to energy sustenance and reduction in an average electricity bill to be paid by the consumer.

Figure 7A:
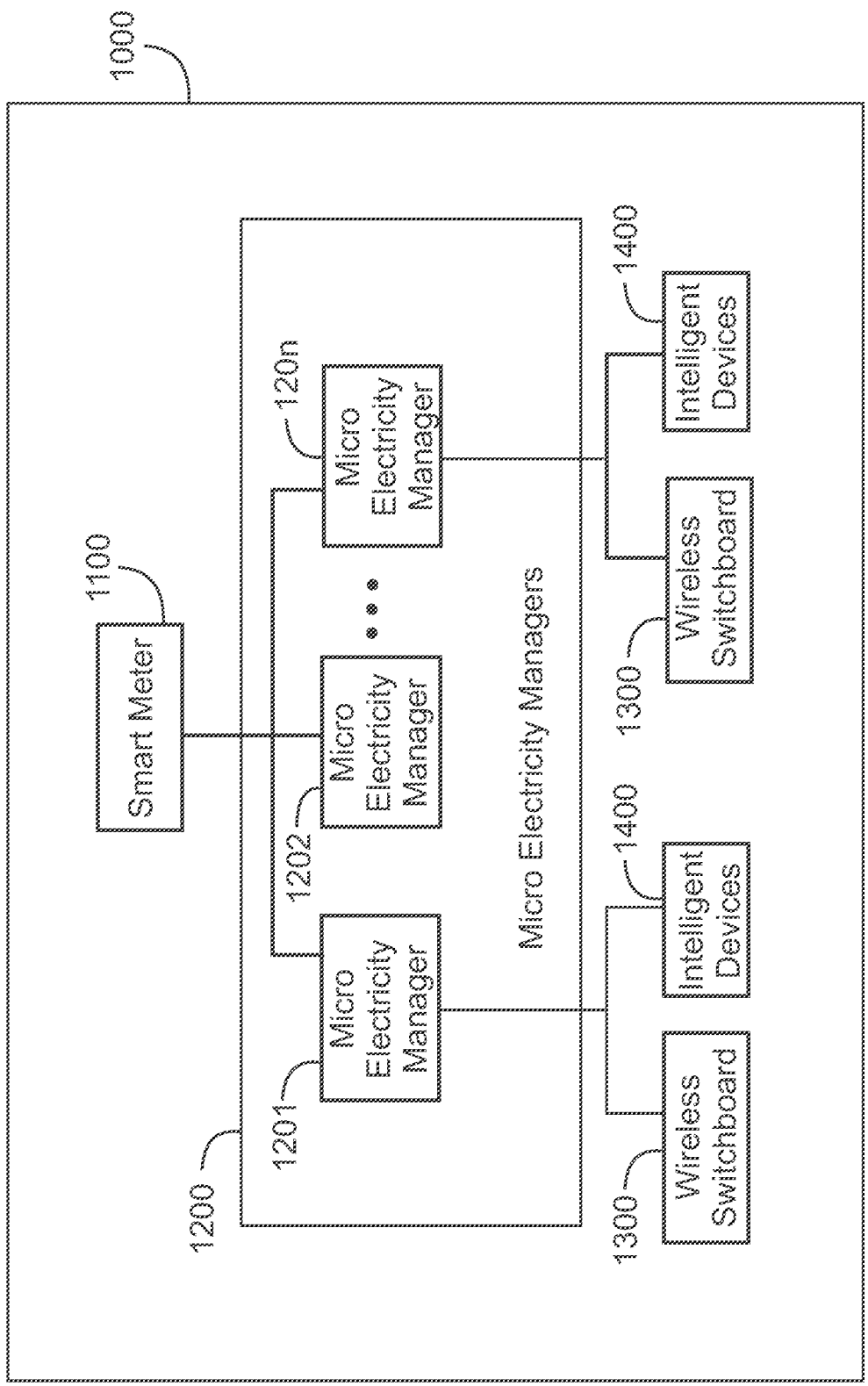
FIG. 7A is a block diagram representation of a system in an embodiment of the present invention.

Another objective in embodiments of the invention is to reduce the dependency of power from the grid. FIG. 7A is a block diagram representation of the system in an embodiment of the invention, depicting a smart meter (1100), micro electricity manager (1200), wireless switch board (1300) and intelligent devices (1400) in a given location. Smart meter (1100) is an intelligent meter for measuring energy consumed by each building in a given location. A plurality of micro electricity managers (1201, 1202 . . . 120*n*) are connected to the smart meters according to one embodiment of the invention.

Figure 7B:
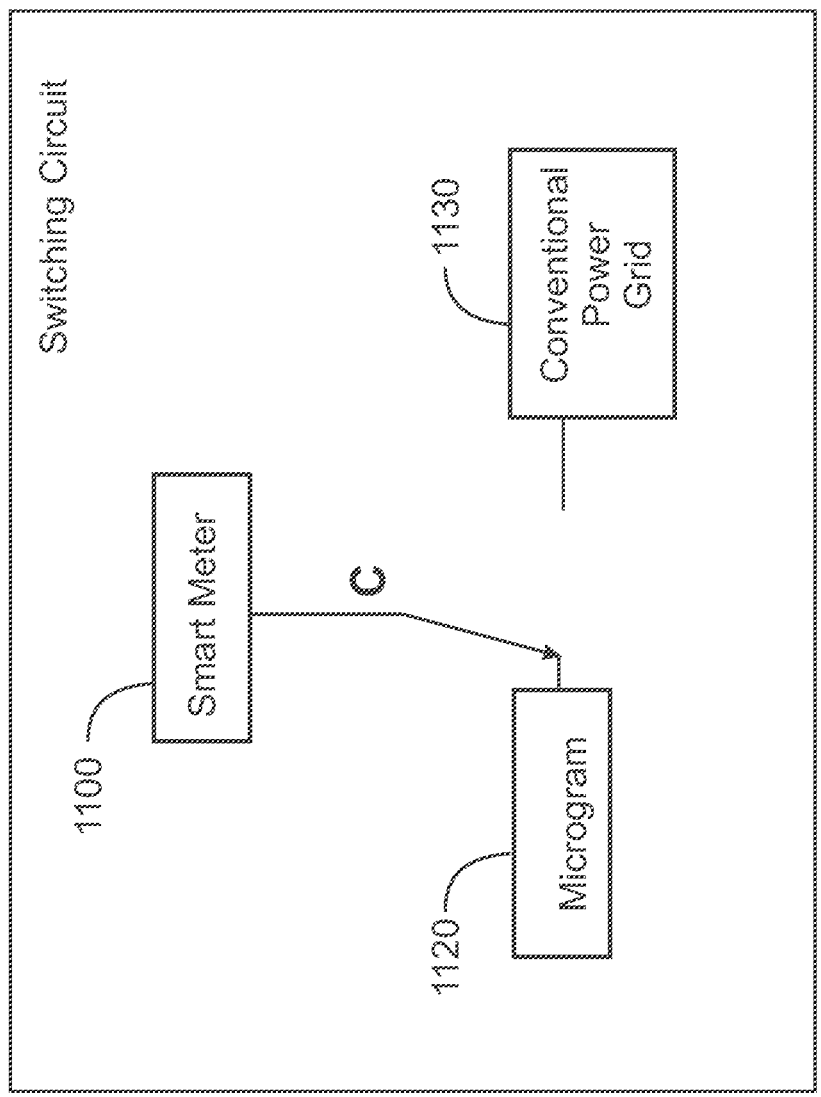
FIG. 7B is a block diagram representation of a switching circuit through which a smart meter connects through a first relay switch to a microgrid in an embodiment of the present invention.

FIG. 7B is a block diagram representation of a switching circuit through which the smart meter connects through a first relay switch to a microgram (1120) and through a second relay switch to a distributed energy generator (1130). The smart meter (1100) is activated through a relay circuit which can connect to two power sources, one from the conventional power grid (1120) and the other from a DEG unit (1130). An objective of the implementation of the relay system is to minimize dependency on powergrid (1120) and to maximize utilization of power from the DEG unit (1130).

For such an optimal use of renewable resources a relay mechanism is implemented between the smart meter and the distribution board. This relay mechanism also works as a control device just after the smart meter and has two power sources as input. The DEG unit also acts as a secondary power source for the operation of equipment in such CPS enabled microgrid system. Decisions regarding the control of daily consumption, equipment and when to use the stored renewable power is calculated by the smart meter (1100) based on analysis of usage and load pattern of the electrical equipment. In order to achieve this the smart meter is connected to at least one micro electricity manager (1200). Micro electricity manager (1200) is an intelligent device manager that communicates and manages various electrical equipment in a building at a given location.

According to an embodiment of the invention a plurality of micro electricity managers (1201, 1202, . . . 120*n*) may be connected to the smart meter (1100). The communication and management of devices is achieved through a computer implemented method for optimal power utilization. The micro electricity manager (1200) is connected through direct wiring connections, wireless communication, or any other communications methodology to receive and send communication. At least one wireless switch board (1300) is connected to a micro electricity manager (1200).

These are intelligent switch board equipped with sensors to measure electricity consumption of equipment and transmit the data wirelessly to the smart meter. The wireless switch board (1300) is capable of measuring electricity consumption through sensors only for low to medium electric loads. In order to measure electricity consumption of heavy loads, at least one intelligent device (1400) is connected to the micro electric manager (1200). The intelligent device (1400) is equipped with sensors to measure the electricity consumption of heavy loads and transmit the data wirelessly to micro electricity manager (1200) at the location.

The intelligent device (1400) and wireless switch boards (1300) at a building in a given location sense a series of events such as switching off or on of electrical equipment and the measured current and send it to the smart meter (1100). One objective of the present invention is dynamic energy management. Analyzing the pattern of usage and load of electrical equipment is a key aspect of dynamic energy management. This pattern is analyzed for given time slot at regular time interval. The smart meter (1100) is integrated with computer-implemented method for optimal power utilization and supply strategy. The method comprises classifying electrical equipment based on power utilization, real-time energy monitoring of the electrical equipment based on context awareness and intelligently managing the electrical equipment based on the availability of power supply.

Classification of Electrical Equipment

A method of classifying electrical equipment based on power utilization comprises steps of receiving information in respect of equipment name, power rating, usage area and location; initializing each electrical equipment at every first use of the electrical equipment to perform a first classification based on its electric load; heuristically determining patterns of electric load and usage during subsequent use of the electrical equipment; and dynamically classifying electric equipment based on electric load and usage of the electrical equipment.

Classification of electrical equipment is based on load criteria namely low, medium and heavy. The electric load of the equipment is based on its power rating. The electrical equipment is further classified as regular load, user priority load or reserved load for prioritizing the operation of the equipment and also for delaying operation of the devices according to availability of the renewable power and tariff plans. According to an embodiment of the invention, the distinguishable features of a consumer device can be equipment type, load type, building type, usage area, and operation duration.

Figure 8:
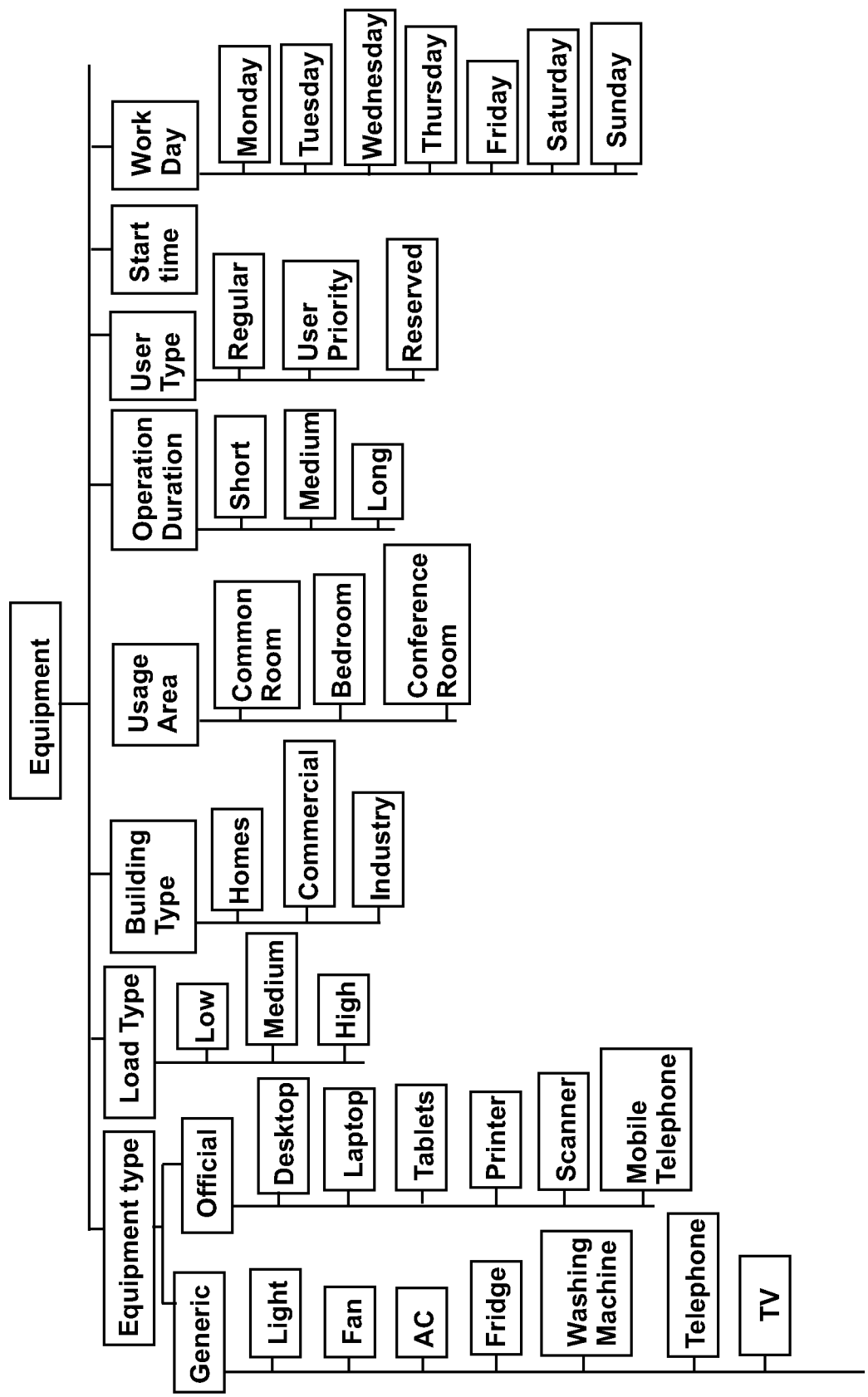
FIG. 8 is a pictorial representation of equipment classification based on power utilization according to one embodiment of the invention.

FIG. 8 depicts a pictorial representation of equipment classification based on power utilization according to one embodiment of the invention. The method of classifying electrical equipment based on power utilization comprises steps of receiving information in respect of equipment name, power rating, usage area and location; initializing each electrical equipment at every first use of the electrical equipment to perform a first classification based on its electric load; heuristically determining patterns of electric load and usage during subsequent use of the electrical equipment; and dynamically classifying electric equipment based on electric load and usage of the electrical equipment. A step of receiving information in respect of equipment name, power rating, usage area and location; initializing each electrical equipment at every first use of the electrical equipment to perform a first classification based on its electric load. According to an embodiment of the invention, this information is stored in a database configured for retrievably storing of information. The step of initializing each electrical equipment at every first use of the electrical equipment to perform a first classification based on its electric load is to perform the initial classification of each of the equipment into different equipment type, load type and usage pattern.

The next step of learning is heuristically determining patterns of electric load and usage during subsequent use of the electrical equipment. In this phase every time each piece of equipment is turned on or off, the usage history is updated, and the system learns about each type of equipment, duration of use, impact of weather and other conditions. According to an embodiment of the invention, the usage history is updated for a minimum period of one month. The last step of dynamically classifying electric equipment based on electric load and usage of the electrical equipment is based on knowledge gained from the heuristic step. Based on the knowledge gained in respect of usage pattern, power rating, equipment type, tariff plans etc., the system will classify each piece of equipment. According to an embodiment of the invention, the electrical equipment is classified as regular, reserved or user priority type. Whenever electrical equipment is added or deleted the classification is repeated to incorporate the new knowledge gained from the learning phase. According to an embodiment of the invention the usage pattern is re-evaluated and usage is updated as regular, reserved.

Real-Time Energy Monitoring of the Electrical Equipment Based on Context Awareness A method of real-time energy monitoring of the electrical equipment based on context awareness comprises a step of identifying contextual information of the electrical equipment based on electric load and usage and collecting real-time contextual information to be transmitted to the smart meter. The building is equipped with different sensors that can monitor occupancy, proximity, vibration, temperature etc. with respect to the data from these sensors, the route of the individual, their transitions, and location. This data is useful for deciding to switch on or switch off a specific piece of electrical equipment.

Intelligent Management of Electrical Equipment

A method of Intelligently managing electrical equipment based on availability of power supply comprises different functions, such as controlling the energy consumption at peak times, updating customers about the real time power consumption at a given location. According to an embodiment of the invention, the controlling of energy consumption at peak times involves setting threshold for total consumption of loads for a given location. According to an embodiment of the invention, the premises can be a home or an office location. Based on the slab defined in the power tariff, allowable usage for each location is fixed. There is a provision for also fixing the electrical budget for a given location. This budget is arrived at based on the equipment at home and connection type.

The method of intelligently managing the electrical equipment involves calculation of total number of energy units for a month that the user can utilize based on the real time pricing from the utility company. This is achieved by real-time data collection from Intelligent Devices and Wireless switchboards installed at a given location. Evaluation and classification of electrical equipment based on load and usage is performed periodically. According to an embodiment of the invention, the evaluation is performed at least once a month. The monthly-allotted unit based on the information received in respect of electrical budget is divided into daily-allotted units. The allocation of allotted units depends on the monthly average operational time of specific days based on the previous month's usage patterns.

Test and Findings

Initial tests have been conducted in a microgrid setup, solar panel and an inverter. The solar energy that has been harvested by the solar panel is fed to the microgrid through the interface inverter and battery setup. Using simulation techniques, a total of 69 different electrical equipments have been evaluated. A total of 744 triggers have been recorded and analyzed. During a sustainability test it has been found that without a CPS enabled microgrid system for optimal power utilization and supply strategy, the average consumption from the grid in a given location is 2.78 KWh/day.

With deployment of a CPS enabled microgrid system for optimal power utilization and supply strategy with a photo voltaic system of 400 W with 100 Ah battery storage and the power cut duration is presumed to be an average of 3 hours/day, power available for consumption from the grid is 1.5 KWh/day. In a CPS enabled system, the control device maintains backup power for operation of prioritized devices under power failure and sets the consumption limit in each time, based on available power. A CPS enabled system and method for optimal power utilization and supply strategy the consumption at peak hours is reduced by 45% and the total daily consumption by 30% per day.

Figure 9:
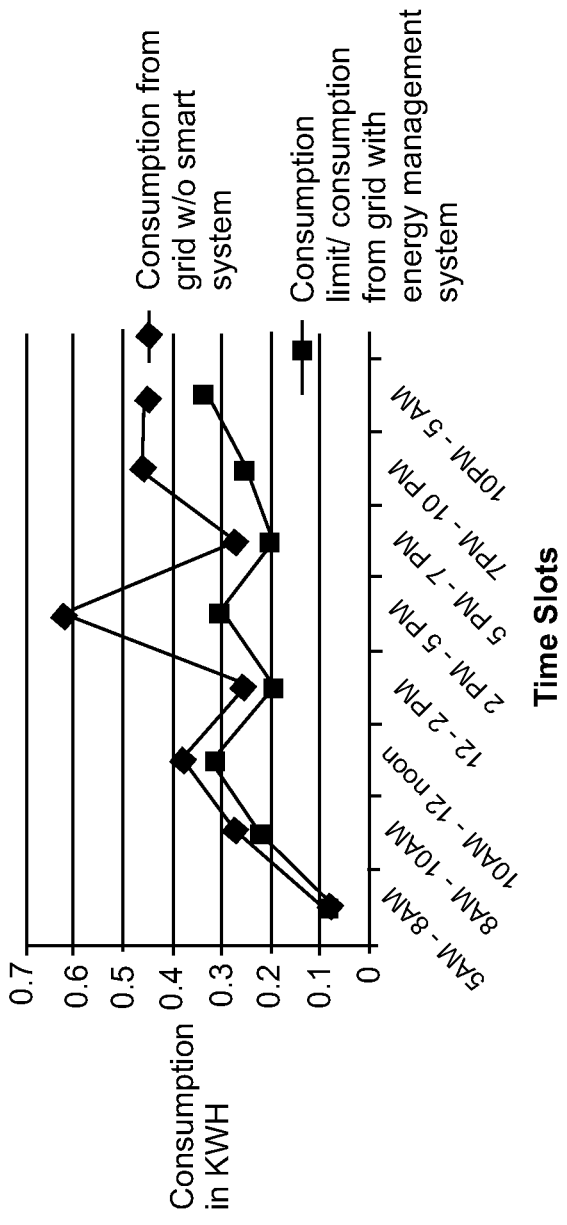
FIG. 9 is a graphic representation of test and findings according to one embodiment of the invention.

FIG. 9 is a graphic representation of test and findings according to one embodiment of the invention. Total consumption from the grid without a CPS enabled microgrid system for optimal power utilization and supply strategy=2.789 KWh. Total consumption from the grid with a CPS enabled microgrid system for optimal power utilization and supply strategy=1.886 KWh.

It will be apparent to one with skill in the art that the power theft detection control system of the invention may be provided using some or all of the mentioned features and components without departing from the spirit and scope of the present invention. There may be many alterations made in the descriptions without departing from the spirit and scope of the present invention.

It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

We claim:

1. A method for power management, comprising:
connecting specific pieces of electrical equipment in a building to a microgrid through a smart meter;
connecting the smart meter also to a distributed energy generator (DEG) providing power from renewable energy sources to the smart meter;
upon a first use of a specific piece of electrical equipment in the building, determining and storing by the smart meter executing an algorithm, a classification of the specific piece of electrical equipment based on equipment name, power rating, usage area and location;
monitoring by the smart meter patterns of electric load and usage during use of the specific piece of electrical equipment after the first use, and updating usage history each time the specific piece of electrical equipment is turned off;
repeating the steps of monitoring and updating for a period of one month; and providing power to the specific piece of electrical equipment by the smart meter from either the microgrid or from the DEG based on availability of power and the classification that is updated based on the patterns of electrical load and the usage.

2. The method of claim 1 wherein the DEG comprises a variety of power sources including one or more of a photovoltaic source, a micro-wind turbine or a fuel cell, each of which produces direct current (DC) that is subsequently converted to alternating current (AC) prior to being switched to the specific piece of electrical equipment.

3. The method of claim 1 further comprising connecting a micro electricity manager executing software, to the specific piece of electrical equipment.

4. The method of claim 3 further comprising connecting the smart meter to a plurality of micro electricity managers which are connected to additional pieces of electrical equipment in the building.

* * * * *